March 5, 1935.  M. F. RICHARDSON  1,993,567
VALVE
Filed Feb. 25, 1931   2 Sheets-Sheet 1
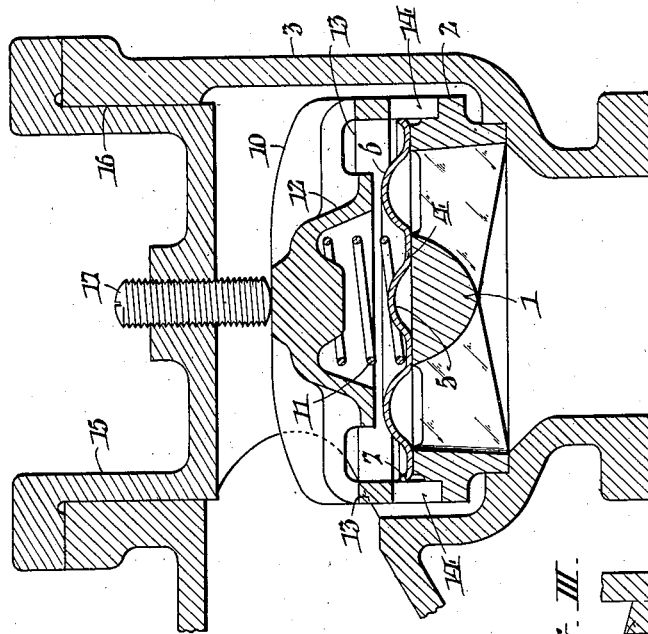
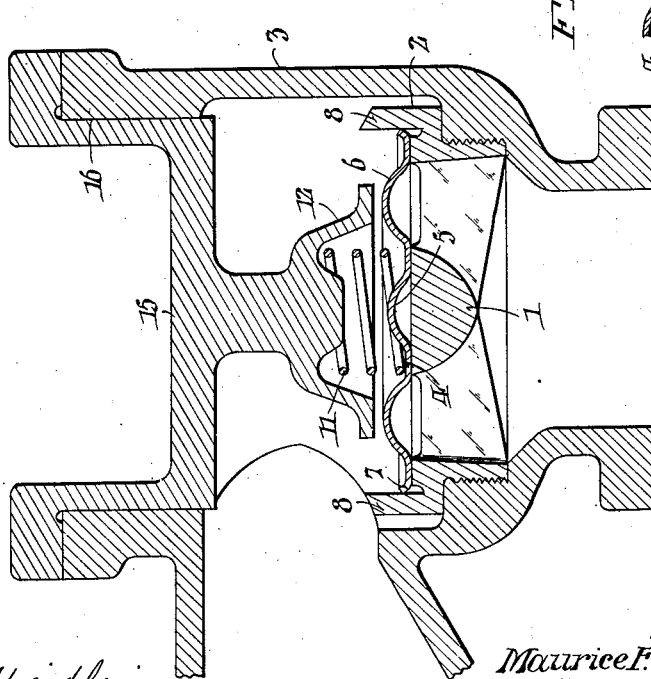
WITNESSES
INVENTOR:
Maurice F. Richardson
BY
ATTORNEYS.

March 5, 1935. M. F. RICHARDSON 1,993,567
VALVE
Filed Feb. 25, 1931 2 Sheets-Sheet 2
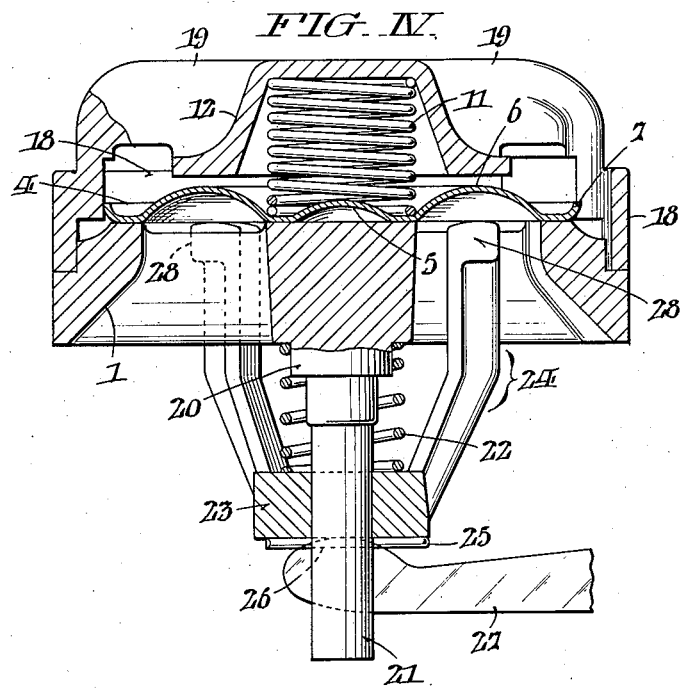
FIG. IV.
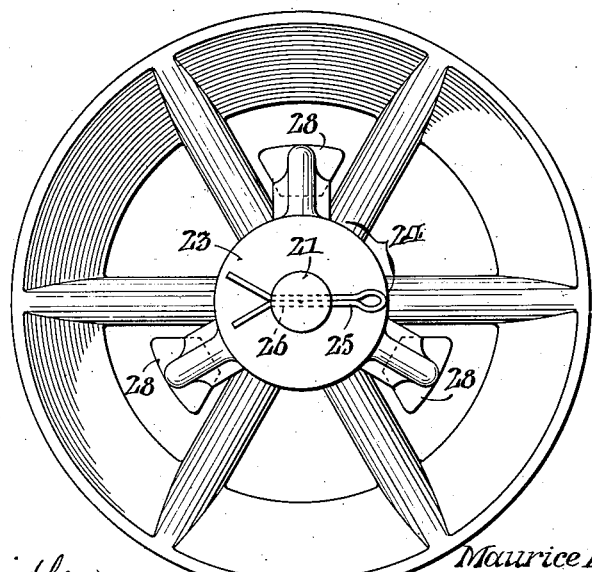
FIG. V.
WITNESSES
John A. Meidler
William Bell, Jr.
INVENTOR.
Maurice F. Richardson,
BY Frailey Paul
ATTORNEY.

Patented Mar. 5, 1935

1,993,567

UNITED STATES PATENT OFFICE 1,993,567

VALVE

Maurice F. Richardson, Berwyn, Pa.

Application February 25, 1931, Serial No. 518,137

1 Claim. (Cl. 251—119)

This invention relates to valves of the disk type more particularly adapted for use in liquid or gas compressors and pumps capable of operating responsively to suction or pressure pulses in opening and closing the valve ports.

More particularly the instant subject-matter is concerned with structural improvements in valves, of the type forming the subject matter of an application for patent filed by me the 25th day of February, 1931, under Serial Number 518,136; and which subsequently matured into U. S. Patent No. 1,900,736, dated March 7, 1933.

Valves of the type referred to include a guard and associated means affording peripheral guidance for the lift or disk element and an important object of this application is the provision of novel means for guiding said element.

Another object has reference to the guard and the manner in which it is rigidly sustained in the valve assemblage.

A further object is the provision of a novel means whereby the valve disk may be moved to relieve any excessive pressure or force operating to retain said disk seated.

Other objects and attendant advantages relating to structural refinements will definitely appear from the ensuing detailed description; while I accomplish such objects and advantages by the means explained in the following specification, shown by the accompanying drawings, and clearly defined in the claim.

In the drawings:

Fig. I is a vertical section of one practical form of my improved valve.

Fig. II is a similar view of a modification thereof.

Fig. III is a fragmentary sectional detail of a slightly different form of means for peripherally guiding the valve disk.

Fig. IV is a vertical section of the adaptation of my improvements to a suction valve and also illustrating a novel means for effecting relief of said valve; and, Fig. V is an underside plan view of the same.

In the several illustrations corresponding parts are, hereinafter, referred to by the same reference characters; while only those features essentially differentiating in the various forms shown will be distinguished by other characters in order to avoid unnecessary repetitive description.

Referring more in detail to the drawings, my novel valve comprises a ported seat member 1, which may be conveniently, although not essentially, formed about the upper marginal portion with a stop rim or flange 2, Figs. I–III; or, it may be devoid of such rim or flange 2 and made cylindric, as shown in Fig. IV. When the seat member 1 is formed with the flange 2, the latter may serve to limit seating of said member in position in a valve chest or housing, comprehensively designated 3 in Figs. I–III. The seat member 1 may be screw-threaded into the chest or housing 3, as shown in Figs. I and III; or, it may be made a force-fit as illustrated by Fig. II.

The valve disk is designated by the numeral 4 and it is struck from imperforate sheet metal to provide a central concavo-convex portion 5, a concentric arched ridge 6, and an upturned angular peripheral rim 7.

The valve disk 4 is afforded peripheral guidance by means of circumferentially-spaced vertical fingers 8 formed integral with the seat flange 2, as shown in Fig. I; by means of similarly allocated projections 9 provided for such purpose in the pump or compressor valve chest or housing 3, as shown in Fig. III; or, a crows-foot 10 may be used as illustrated in Fig. II and as fully explained in the patented application hereinbefore referred to. In either case, however, the valve disk 4 is normally held to the seat member 2 by a spring 11 retained in compression between said disk and an overhanging guard 12. As shown, the valve disc 4 has an annular zone of contact with the central hub portion of the valve seat 1, around the central cavity at 5. Accordingly, the imperforate central portion 5 of the valve disc 4 cooperates with the seat hub to afford a fluid cushion to cushion the closing of the valve.

The overhanging guard 12 may be made an integral part of the crows-foot 10, as shown in Fig. II, in which case said crows-foot conveniently embodies an annular portion 13 with claws 14 finished on the inner sides to a forced-fit on the seat member 1. Or, the guard 12 may be formed as an integral part of a cupped-cover 15 for snug fitment in the bore 16 of the valve chest or housing 3, as shown in Fig. I, said cover being secured in place by any of the well-known means, not shown.

When the guard 12 is not made an integral part of the cover 15, said cover may be fitted centrally with an adjuster screw 17, so that the valve assemblage as a whole can be securely retained in the chest or housing 3 in a manner obvious from Fig. II.

In the form of my invention shown by Figs. IV and V, which is conveniently adapted as a suction-lift valve, it will be seen that the guard 12 is formed integral with an annulus or skirt 18 and superposed spider 19, said skirt being machined on the inner lower part for forced-fit on the valve seat member 1, as above set forth; while both the seat member 1 and the skirt outer face are machined to present an unbroken smooth surface for snug fitment in a suitably finished bore, if desired.

The valve seat member 1, in this form of my invention, is provided with a concentric projection 20 at the underside, having an axial extension or rod section 21, for a purpose now to be set forth. Fitting snugly about the projection 20 is a spring 22 normally retained in compression by abutment with the collar portion 23 of an inverted tripod device 24; said device being held in place on the rod section 21 by means of a cotter-pin 25, engaged in an aperture 26 therethrough; or, any other convenient means may be employed for positioning the tripod device 24 on the rod section 21, to maintain the spring 22 under compression, in an obvious manner.

Now, it will be clearly apparent that, should the valve disk 4 be subjected to any pressure or force tending to interfere with its proper functioning, said disk may be raised manually or automatically, as by means of an appropriate actuative element 27 engaging the collar portion 23 of the inverted tripod device 24. It will, also, be understood that the upper ends 28 of the legs of the tripod device 24 are positioned relative to the underside of the valve disk 4, so as to be normally out-of-contact therewith, but that upon elevation of said device in opposition to the spring 22, they engage the latter to effect the requisite pressure relief.

From the foregoing it is believed my invention will be well understood, and that it embodies all the features of advantage hereinbefore set forth; while it is to be also understood that minor structural changes may be resorted to without departing from the scope of the following claim.

Having thus described my invention, I claim:

In a valve the combination of a ported member providing an outer valve engaging area with a central hub portion affording an inner valve engaging area, said ported member also embodying a circumferential seating flange, below said outer valve engaging area, with spaced upstanding fingers around and within the peripheral confines of said flange; and a discous valve embodying a central concavo-convex dome portion and an annular arched ridge located between annular flats, said flats being arranged for coaction with the inner and outer valve engaging areas, said valve being vertically guided by the upstanding fingers and the ported member hub cooperating with the valve central dome portion to cushion closing of the valve.

MAURICE F. RICHARDSON.